United States Patent [19]
Barcza

[11] Patent Number: 5,215,257
[45] Date of Patent: Jun. 1, 1993

[54] DIVERGENT SEAL ARRANGEMENT FOR A CONVERGENT/DIVERGENT NOZZLE

[75] Inventor: W. Kevin Barcza, Stuart, Fla.

[73] Assignee: United Technologies Corporation, Hartford, Conn.

[21] Appl. No.: 914,291

[22] Filed: Jul. 16, 1992

[51] Int. Cl.⁵ .................... F02K 1/02; B64C 15/06
[52] U.S. Cl. ............................................. 239/265.39
[58] Field of Search ............... 239/265.19, 265.33, 239/265.39, 265.41, 587.5, 587.6; 60/228, 230, 231; 244/12.5, 23 D

[56] References Cited

U.S. PATENT DOCUMENTS

| | | | |
|---|---|---|---|
| 4,994,660 | 2/1991 | Hauer | 239/265.41 |
| 5,039,014 | 8/1991 | Lippmeier | 239/265.39 |
| 5,076,496 | 12/1991 | Lippmeier | 239/265.41 |
| 5,082,182 | 1/1992 | Bruchez, Jr. et al. | 239/265.35 |

Primary Examiner—Andres Kashnikow
Assistant Examiner—Kevin P. Weldon
Attorney, Agent, or Firm—Edward L. Kochey, Jr.

[57] ABSTRACT

The divergent seal of a thrust vectoring nozzle has an elongated corrugated stiffening sheet with a backbone secured to the air side. The backbone is stiff perpendicular to the sheet, but flexible in torsion. A face sheet secured only at the upstream end covers the gas side of the stiffening sheet.

13 Claims, 4 Drawing Sheets

DIVERGENT SEAL ARRANGEMENT FOR A CONVERGENT/DIVERGENT NOZZLE

DESCRIPTION

Technical Field

The invention relates to gas turbine engines and in particular to vectorial discharge nozzles therefor.

Background of the Invention

Gas turbine engines for aircraft achieve thrust by discharging hot gases through the exhaust nozzle. Efficient operation for multi-mission application dictates the use of variable area convergent/divergent nozzles.

Variable convergent/divergent configuration is achieved in axisymmetric nozzles by the use of a plurality of circumferentially arranged flaps. Overlapping seals are located between adjacent flaps.

The hinge arrangement must be provided between each convergent flap or seal and each divergent flap or seal. Variations may be made during operation, of the throat and terminal discharge openings.

Increased maneuverability of the aircraft can be accomplished by thrust vectoring. Here the discharge of gas is vectored from the axial direction to achieve a thrust component which is up, down or sideways. As shown in U.S. Pat. No. 5,082,182 (Bruchez et al, issued Jan. 21, 1992) the vectoring may be accomplished by vectoring movement of the divergent flaps and seals only. The convergent flaps and seals remain symmetrical.

The hinges between the convergent and divergent flap must be capable of rotation around both the radial axis and lateral axis of the hinge. The divergent seal must also maintain a seal against both adjacent flaps at all times to prevent leakage of the hot gas stream and loss of thrust.

Cooling air is discharged along the surface of the convergent nozzle, passing through the throat to the divergent nozzle. The hinge must neither significantly affect the geometry of the nozzle throat nor block the cooling flow from the convergent nozzle.

During vectoring all of the divergent flaps move in the same direction (i.e. upwardly, to the right, etc.). The divergent flaps thereby become radially offset at the trailing edges. The seal must be able to maintain contact with these flaps throughout that movement. The seal must be able to twist axially through an angle on the order of 20 degrees from the upstream end to the downstream end in order to maintain this contact, particularly at large nozzle throat areas.

The seal must also support high positive and negative pressures caused by the divergent vectoring into and away from the gas flow stream. The seal must also tolerate extreme thermal conditions because of the vectoring into and contact with the hot gas flow.

SUMMARY OF THE INVENTION

The seal comprises an elongated substantially rectangular stiffening sheet extending longitudinally of the nozzle. The stiffening sheet has a gas side toward the inside of the nozzle and an opposite air side facing outwardly from the nozzle. An elongated backbone runs longitudinally along the stiffening sheet perpendicular to the sheet and secured to the air side of the sheet. The height-to-width ratio of this backbone is less than 10, so that the backbone is perpendicular to the sheet, but flexible parallel to the sheet to permit twisting.

The stiffening sheet is stiff in bending around the longitudinal axis of the sheet since it is substantially a flat plate in that direction. It is, however, flexible in torsion around the axis. A face sheet covers the gas side of the stiffening sheet. It is folded around the longitudinal edges of the stiffening sheet and rigidly secured to the stiffening sheet at only the upstream end. The seal is hinged to an upstream convergent seal.

The face sheet is thermally free to grow since it is secured only at one location. It is also secured in a manner which avoids the need for welding thereby permitting the use of materials tolerant of higher temperatures. A stiff backbone running along the plate stiffens it sufficiently to tolerate the positive and negative pressures existing on the seal. The seal is relatively free to twist because of corrugations on the stiffening plate and the freedom from restraint by the face sheet.

DESCRIPTION OF THE PREFERRED EMBODIMENT

Figure 1:
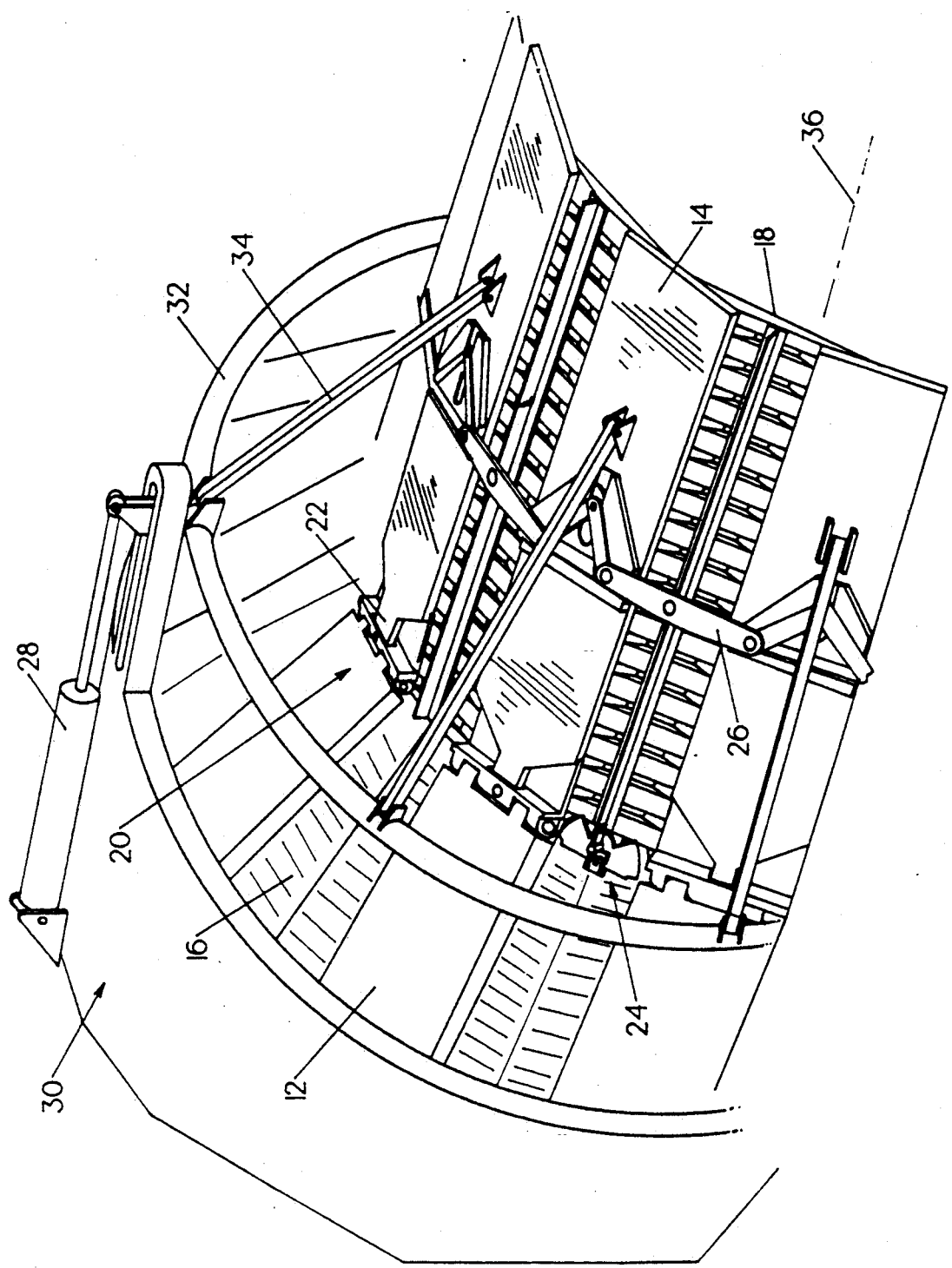
FIG. 1 is a partial isometric of the convergent/divergent nozzle.

FIG. 1 is a general view of convergent/divergent nozzle 10 with convergent flaps 12 and divergent flaps 14. Interposed between the flaps are convergent seals 16 and divergent seals 18.

Convergent and divergent flap hinge assembly 20 includes a divergent flap hinge seal 22. This divergent flap hinge seal overlaps divergent flap 14.

Convergent to divergent seal hinge 24 joins the convergent and divergent seals. Divergent seal centering and restraining arrangement 26 centers and restrains the divergent seals 18.

Conventional drives may be used to vary the angular position of convergent flaps 12 and convergent seals 16, thereby varying the throat opening of the nozzle. Actuator 28 operating against the static upstream structure 30 drives a sync ring 32. This sync ring is connected through drive links 34 to the divergent flaps 14. By translating ring 32 rearwardly, the exit opening is reduced. By tilting the sync ring 32, the flaps 14 are vectored with relation to the nozzle axis 36 to achieve a vectoring discharge of the nozzle.

Figure 2:
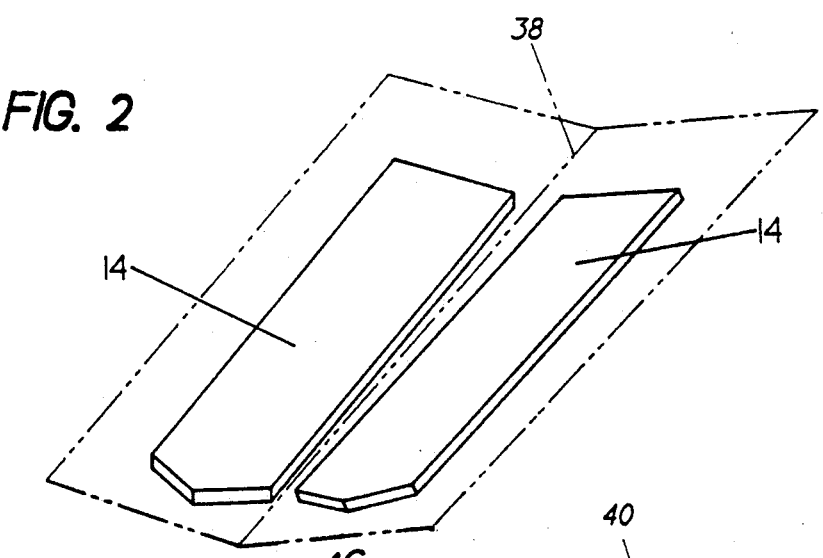
FIG. 2 is an isometric view showing two adjacent flaps at the axial thrust position.

FIG. 2 shows the divergent flaps in the axial thrust position where the face planes of the two adjacent flaps 14 intersect on a line 38 which bisects the space between the flaps.

Figure 3:
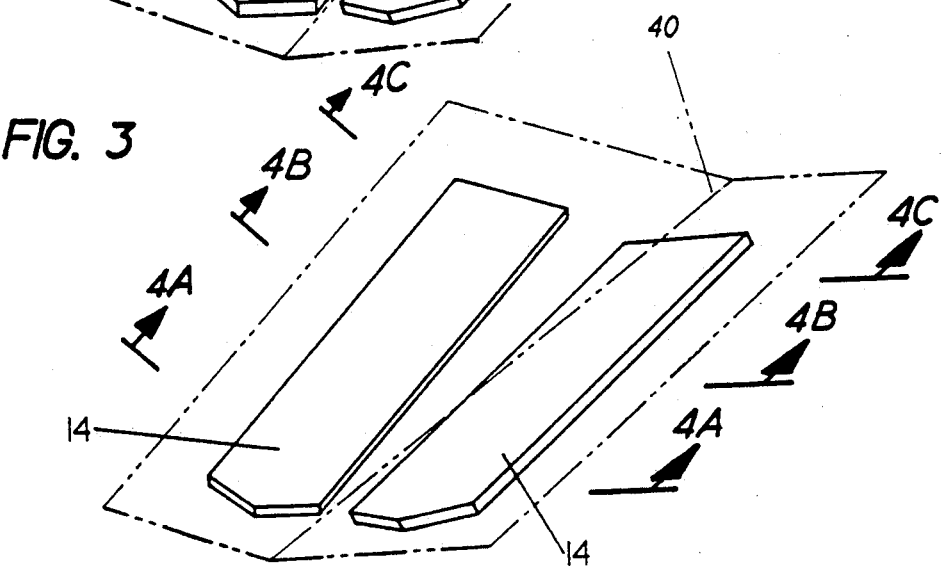
FIG. 3 is an isometric view showing two adjacent flaps at the vectoring thrust position.

FIG. 3 illustrates these same two adjacent flaps 14 in the vectored position where the face planes of the two adjacent flaps intersect at a line 40 which is skewed from the midpoint between the two flaps.

Figure 4:
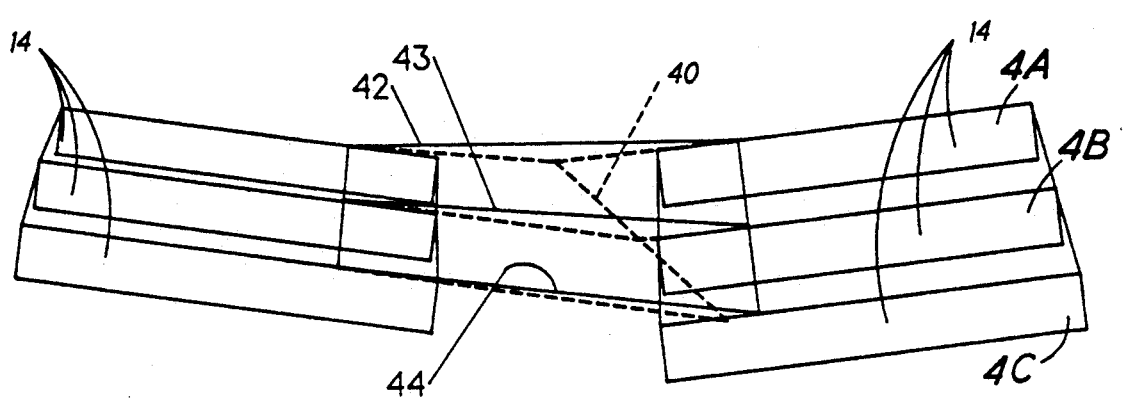
FIG. 4 is a series of sections through FIG. 3.

FIG. 4 now illustrates a series of sections through the flaps of FIG. 3 at sections A—A, B—B and C—C. Here again the intersection of the surface planes from flaps 14 are seen at intersecting along line 40. The divergent seal with the sealing surface indicated by 42 must seal in the normal manner at the forward end, but must twist to positions 43 and 44 toward the aft end of the flaps.

Figure 5:
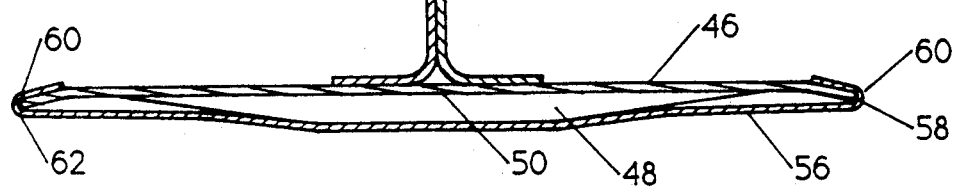
FIG. 5 is a section through the divergent seal.

Referring to FIG. 5 stiffening sheet 46 is an elongated substantially rectangular sheet extending longitudinally of the nozzle. It includes a plurality of corrugations 48 extending across the sheet which stiffen the sheet in the transverse direction while permitting flexibility in torsion around the longitudinal axis 50.

A backbone 52 is stiff perpendicular to the sheet and flexible parallel to the sheet by having a height over thickness ratio of less than 10. This may be secured to the stiffening sheet by forming a T member with additional outstanding arms 54 and spot welding these arms, without degrading the flexibility of the sheet in torsion.

The face sheet 56 is secured to the stiffening sheet by longitudinal edges 60 of the stiffening sheet. The overlap of the bent edges is greater than the differential expansion of the face sheet and the stiffening sheet during operation of the nozzle. This precludes disengagement of the face sheet. The face sheet is backed up by corrugations 48, but is free from the stiffening sheet, permitting thermal expansion relative to the sheet. The only rigid attachment between the face sheet and the stiffening sheet is at the upstream end. This face sheet may be made of a columbium alloy, which is possible because no welding is required.

Figure 6:
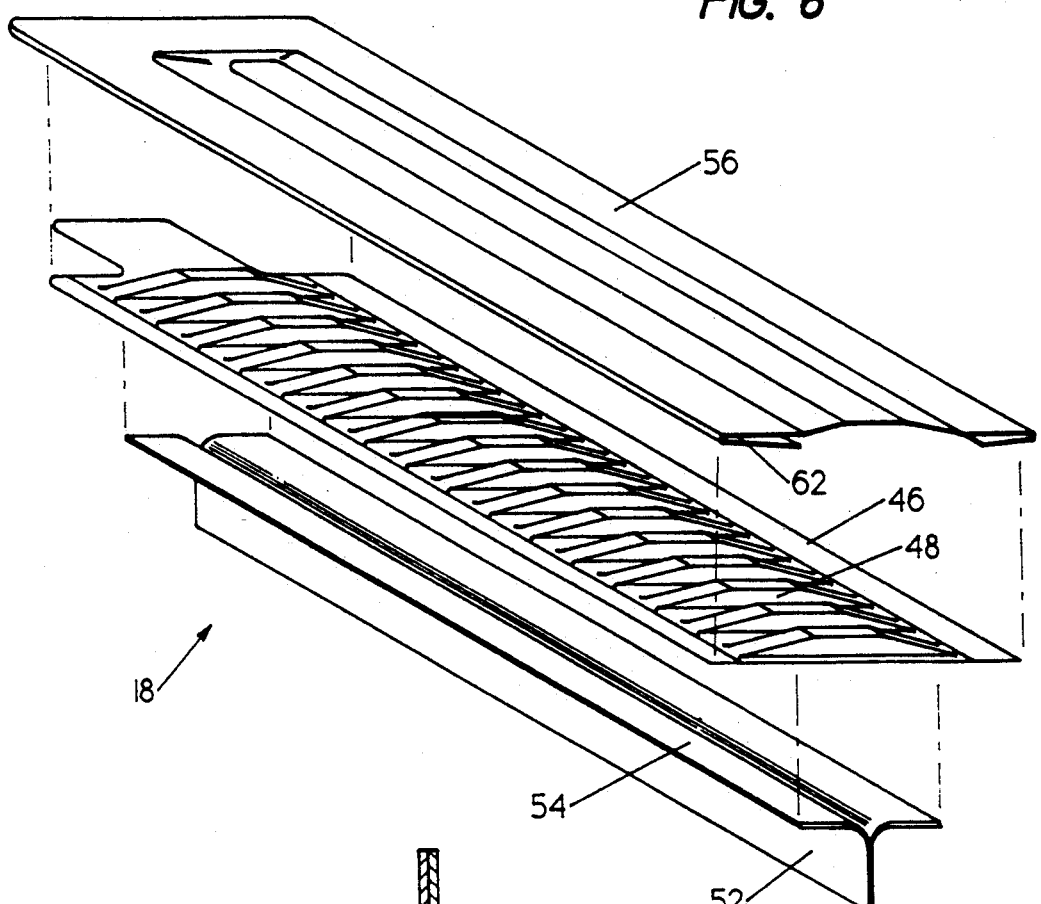
FIG. 6 is an exploded view of part of the divergent seal.

Seal surfaces 62 can again be seen at the edge of the face sheet 56 in the exploded view of FIG. 6. The arrangement and general appearance of the stiffening sheet 46 and the backbone 52 can also be seen.

Figure 7:
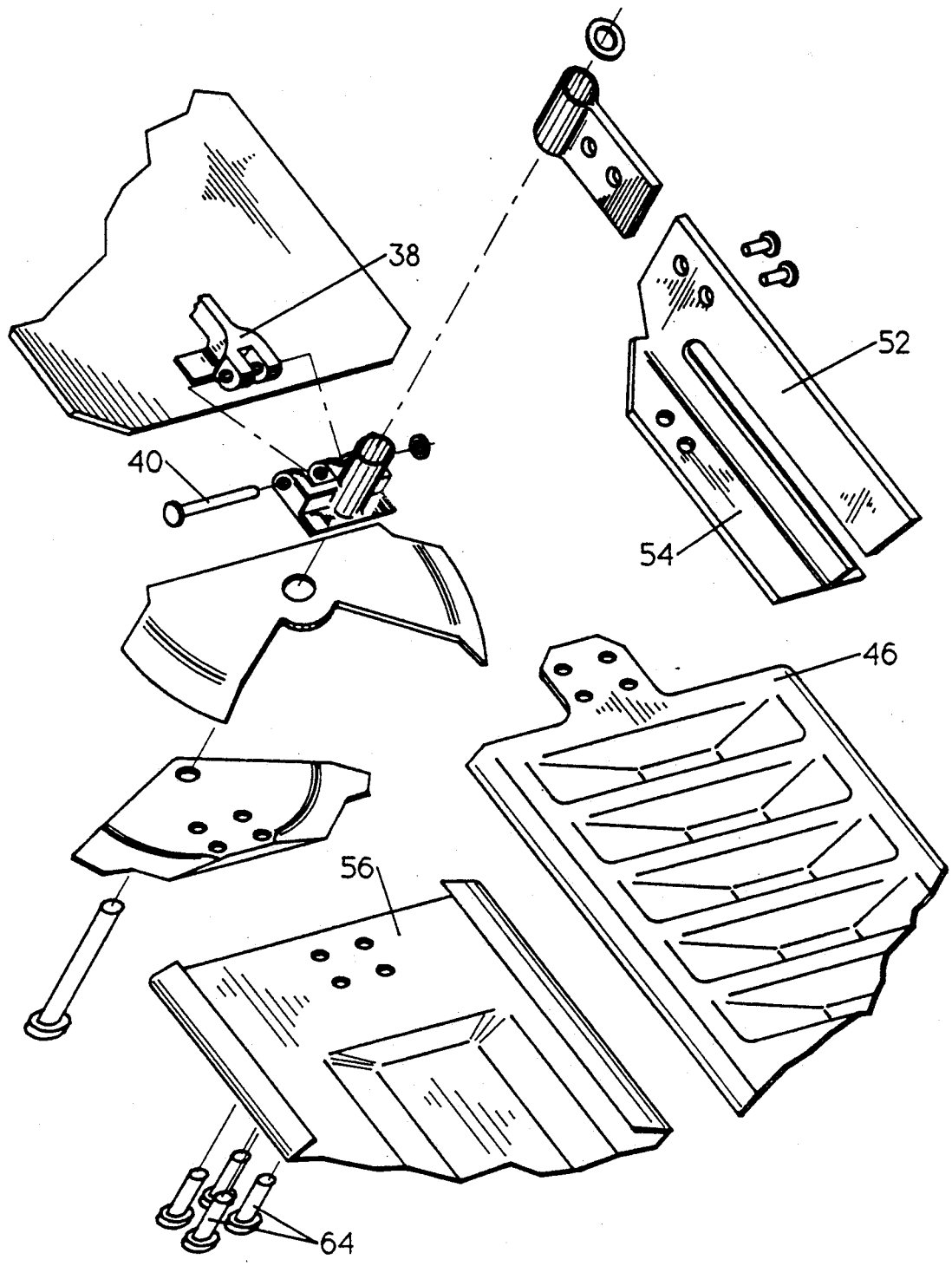
FIG. 7 is an exploded view of the upstream end of the divergent seals.

Referring to FIG. 7, solid rivets 64 pass through face sheet 56, stiffening sheet 46 and the support 54 of the backbone 52 at the upstream end of the sheet adjacent the hinge. This is the only rigid connection between the face sheet and any other member, thereby not only providing freedom of expansion of the face sheet, but relieving the remainder of the seal from the resistance of the face sheet to twisting in the manner which would occur were the edges secured.

Figure 8:
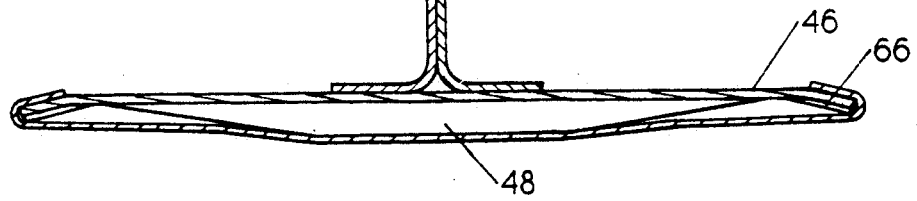
FIG. 8 is a section through an alternate divergent seal arrangement.

As the stiffening sheet twists, the length of the outer edges increases thereby inducing a stretching in the outer edge. As illustrated in the earlier described embodiment, the longitudinal edge of the stiffening sheet is straight and has been found to be capable of sufficient stretching. Increased flexibility in twisting can be achieved, however, by continuing the corrugations 48 to the edge 66 of the stiffening sheet 46 as shown in FIG. 8. Even minor corrugations in the order of half the thickness of the sheet remaining at the edge help to fulfill this function.

The seal herein described is sufficiently flexible in torsion to twist through a 20 degree angle from one end to the other and maintain contact with the adjacent flaps. The corrugations supply transverse stiffness while the backbone supplies longitudinal stiffness to an extent capable of supporting the high positive and negative existing pressures. They do this without interfering with the required torsional flexibility. This seal requires no welds which would interfere with the use of a material such as columbium tolerant of high temperatures. Furthermore, the face plate is structurally free from the combination stiffening sheet and backbone in manner to avoid forming a beam structure, and thermally free to permit expansion of longitudinal end transversely.

I claim:

1. A divergent seal arrangement for sealing between adjacent divergent flaps of a vectoring C/D nozzle comprising:
    an elongated substantially rectangular stiffening sheet extending longitudinally of said nozzle having a gas side toward the inside of said nozzle and an opposite air side;
    an elongated backbone running longitudinal of said stiffening sheet, perpendicular to said sheet, secured to the air side of said sheet and having a height to width ratio of less than 10, whereby said backbone is stiff perpendicular to said sheet but flexible parallel to said sheet;
    said stiffening sheet stiff in bending around a longitudinal axis along said sheet, but flexible in torsion around said axis;
    a face sheet covering the gas side of said stiffening sheet, folded around the longitudinal edges of said stiffening sheet and rigidly secured to said stiffening sheet at only one location; and
    a hinge means for securing an upstream convergent seal to one of said stiffening sheet and said backbone.

2. A divergent seal arrangement as in claim 1 further comprising:
    said backbone having additionally outwardly extension forming a T member, having a head, the head being secured to said stiffening member.

3. A divergent seal arrangement as in claim 1, further comprising:
    said stiffening sheet having transverse corrugations.

4. A divergent seal arrangement as in claim 3, further comprising:
    said corrugations decreasing in depth toward, but still remaining at the longitudinal edges of said stiffening sheet.

5. A divergent seal arrangement as in claim 1, further comprising:
    said face sheet folded around each edge of said stiffening plate with the overlap being a distance greater than the differential expansion between said face sheet and said stiffening sheet in the transverse direction during operation of said C/D nozzle.

6. A divergent seal arrangement as in claim 1, further comprising:
    said face sheet rigidly secured at the upstream end of said face sheet.

7. A divergent seal arrangement as in claim 6, further comprising:
    said face sheet formed of a columbium alloy and riveted to said stiffening sheet.

8. A divergent seal arrangement as in claim 3, further comprising:
    said face sheet folded around each edge of said stiffening plate with the overlap being a distance greater than the differential expansion between said face sheet and said stiffening sheet in the transverse direction during operation of said C/D nozzle.

9. A divergent seal arrangement as in claim 8, further comprising:
    said face sheet rigidly secured at the upstream end of said face sheet.

10. A divergent seal arrangement as in claim 9, further comprising:

said face sheet formed of a columbium alloy and riveted to said stiffening sheet.

11. A divergent seal arrangement as in claim 4, further comprising:

said face sheet folded around each edge of said stiffening plate with the overlap being a distance greater than the differential expansion between said face sheet and said stiffening sheet in the transverse direction during operation of said C/D nozzle.

12. A divergent seal arrangement as in claim 11, further comprising:

said face sheet formed of a columbium alloy and riveted to said stiffening sheet.

13. A divergent seal arrangement as in claim 12, further comprising:

said face sheet rigidly secured at the upstream end of said face sheet.

* * * * *